United States Patent
Yamashita et al.

[11] Patent Number: 5,903,399
[45] Date of Patent: May 11, 1999

[54] UV-CURABLE FRESNEL LENS RESIN COMPOSITION, FRESNEL LENS, AND BACK PROJECTION SCREEN

[75] Inventors: Tsutomu Yamashita; Michiharu Okubo, both of Kyoto; Makoto Honda; Futoshi Osawa, both of Tokyo, all of Japan

[73] Assignees: Sanyo Chemical Industries, Ltd., Kyoto; Dainippon Printing Co., Ltd., Tokyo, both of Japan

[21] Appl. No.: 09/018,854

[22] Filed: Feb. 4, 1998

Related U.S. Application Data

[63] Continuation of application No. 08/688,260, Jul. 29, 1996, Pat. No. 5,805,358.

[30] Foreign Application Priority Data

| Jul. 29, 1995 | [JP] | Japan | 7-212400 |
| Jul. 29, 1995 | [JP] | Japan | 7-212401 |
| Jul. 29, 1995 | [JP] | Japan | 7-212402 |
| Jul. 29, 1995 | [JP] | Japan | 7-212403 |

[51] Int. Cl.$^6$ .................................................. G02B 3/08
[52] U.S. Cl. .................... 359/742; 522/96; 428/424.2; 359/443; 359/448; 359/457
[58] Field of Search .................................. 359/457, 742, 359/443, 448; 428/424.4; 522/96

[56] References Cited

U.S. PATENT DOCUMENTS

| 3,712,707 | 1/1973 | Henkes, Jr. | 350/121 |
| 4,083,626 | 4/1978 | Miyahara et al. | 350/117 |
| 5,410,006 | 4/1995 | Tachibana et al. | 526/292.2 |
| 5,820,988 | 10/1998 | Nagaoka | 428/423.1 |

*Primary Examiner*—James J. Seidleck
*Assistant Examiner*—Sanza McClendon
*Attorney, Agent, or Firm*—Pollock, Vande Sande & Amernick

[57] ABSTRACT

UV-curable Fresnel lens resin compositions [a] comprising a (meth)acrylate containing hydroxyl group and aromatic ring (A1), a urethane group-contining (meth) acrylate (A2) comprising an aromatic diol, an aromatic ringcontaining monofunctional (meth)acrylate (A3), and a photopolymerization initiator (B) and [1b] comprising (A1), a mono- or di(meth)acrylate monomer (A4), and (B), further supplemented with a polyester (C1) comprising an aromatic diol and a phosphate (C2) for the formation of a Fresnel lens on a sheet or plate made of a methyl methacrylate (co) polymer; a Fresnel lens formed by UV cure of composition [1a] or [1b]; and a rear projection screen including a sheet or plate carrying said Fresnel lens. The Fresnel lens has high refractive index, antistatic properties and is satisfactory in adhesion-to a sheet or plate.

6 Claims, 1 Drawing Sheet

FIG. 1

UV-CURABLE FRESNEL LENS RESIN COMPOSITION, FRESNEL LENS, AND BACK PROJECTION SCREEN

This application is a continuation of Ser. No. 08/688,260, filed Jul. 29, 1996, now U.S. Pat. No. 5,805,358.

FIELD OF THE INVENTION

The present invention relates to a UV-curable Fresnel lens resin composition, a Fresnel lens, and a rear projection screen. More particularly, the invention relates to a UV-curable Fresnel lens resin composition showing good adhesion to a sheet or plate made of a homopolymer of methyl methacrylate or a copolymer of methyl methacrylate with one or more other acrylate or methacrylate (hereinafter referred to collectively as methyl methacrylate (co)polymer); a Fresnel lens comprising a resin formed by UV cure of said composition in situ on said sheet or plate; and a rear projection screen including a sheet or plate carrying said Fresnel lens.

DESCRIPTION OF THE PRIOR ART

The Fresnel lens heretofore used for the fabrication of a rear projection screen is manufactured typically by casting a UV-curable resin composition between a mold and a transparent resin sheet or plate made of a methyl methacrylate (co)polymer, and exposing the resin composition to ultraviolet light, and thereby curing it.

With the recent trend toward reduced thickness of projection television devices, a demand exists for resins with high refractive indices and accordingly a variety of UV-curable resin compositions have been proposed (e.g. Japanese Kokai Publications Hei-5-65318, Hei-5-155944, Hei-5-247156, and U.S. Pat. No. 5,453,452).

However, the proposed UV-curable resin compositions are unsatisfactory in the adhesion to a sheet or plate made of a methyl methacrylate (co)polymer, and require a primer on the sheet or plates Moreover, the lens obtainable from any of those UV-curable resin compositions has the problem of static deposition of dust particles.

As compositions which can be used without the aid of a primer and yet show improved adhesion to a sheet or plate, the following compositions ① and ② were proposed. On the other hand, as compositions solving the above-mentioned problem of static deposition of dust particles, the following composition ③ has been proposed.

① A composition comprising diacrylate or dimethacrylate of a low molecular hydrocarbon diol (e.g. EP-510754A1)
② A composition comprising an epoxy acrylate or methacrylate (e.g. Japanese Kokai Publication Hei-5-310871)
③ A UV-curable resin composition having antistatic properties (e.g. Japanese Kokai Publications Hei-1-302201 and Hei-3-157412)

However, any of these compositions ① to ③ has the drawback that an attempt to insure sufficiently high adhesion to a sheet or plate results in a reduced refractive index and/or poor scratch resistance of the lens surface owing to embrittlement of the resin, so that it has been impossible to obtain a Fresnel lens meeting all the requirements of acceptable adhesion, refractive index, and scratch resistances.

It is an object of the present invention to provide a UV-curable resin composition capable of providing a Fresnel lens satisfactory in all the parameters of adhesion to a sheet or plate, refractive index, and scratch resistance.

It is a further object of the present invention to provide a UV-curable resin composition capable of providing a Fresnel lens further having antistatic properties.

It is a still another object of the present invention to provide a Fresnel lens having all of the above-mentioned characteristics.

It is a further object of the present invention to provide a rear projection screen including a Fresnel lens sheet or Fresnel lens plate carrying a Fresnel lens having all of said desirable characteristics.

SUMMARY OF THE INVENTION

The above objects have been accomplished by the present invention which provides the following UV-curable resin compositions [1a] and [1b]; Fresnel lenses [2a] and [2b]; and rear projection screens [3a] and [3b].

[1a] UV-curable resin composition

A UV-curable Fresnel lens resin composition for use in the formation of a Fresnel lens on a sheet or plate made of a methyl methacrylate (co)polymer, said resin composition comprising (A1) an acrylate or methacrylate (herein after referred to collectively as (meth)acrylate) containing hydroxyl group and aromatic ring;

(A2) a urethane group-containig (meth)acrylate having a moiety of an aromatic diol (a1) represented by the following general formula:

wherein Ph represents 1,4-phenylene group, $R^1$, $R^2$ and $R^3$ each represents hydrogen atom or methyl group, m and n each represents an integer of 1 to 15, and (m+n) is equal to 2 to 20;

(A3) an aromatic ring-containing monofunctional (meth)acrylate; and (B) a photopolymerization initiators.

[1b] UV-curable resin composition

A UV-curable Fresnel lens resin composition for use in the formation of a Fresnel lens on a sheet or plate made of a methyl methacrylate (co)polymer, said resin composition comprising (A1) a (meth)acrylate containing hydroxyl group and aromatic ring, (A4) a mono- or di(meth)acrylate monomer with a molecular weight of 80 to 200 and a boiling point of over 150° C. at atmospheric pressure, preferably ethylene glycol di(meth) acrylate and/or tetrahydrofurfuryl (meth)acrylate;

(B) a photopolymerization initiator;

(C1) a polyester having a moiety of an aromatic diol (a1) represented by the following general formula:

wherein Ph represents 1,4-phenylene group, $R^1$, $R^2$ and $R^3$ each represents hydrogen atom or methyl group, m and n each represents an integer of 1 to 15, and (m+n) is equal to 2 to 20; and (C2) a phosphate represented by the general formula:

wherein R represents alkyl group containing 5 to 16 carbon atoms, s represents an integer of 1 to 4, and t represents 1 or 2.

[2a] Fresnel lens

A Fresnel lens comprising a resin formed by UV cure of composition [1a] in situ on a sheet or plate made of a methyl methacrylate (co)polymer.

[2b] Fresnel lens

A Fresnel lens comprising a resin formed by UV cure of composition [1b] in situ on a sheet or plate made of a methyl methacrylate (co)polymer.

[3a] Rear projection screen

A rear projection screen comprising a Fresnel lens sheet or Fresnel lens plate carrying the Fresnel lens [2a] as disposed on a sheet or plate made of a methyl methacrylate (co)polymer.

[3b] Rear projection screen

A rear projection screen comprising a Fresnel lens sheet or Fresnel lens plate carrying the Fresnel lens [2b] as disposed on a sheet or plate made of a methyl methacrylate (co)polymer.

BRIEF DESCRIPTION OF THE DRAWINGS

In FIG. 1, the reference numeral 1 stands for a rear projection screen, 2 for a Fresnel lens sheet or Fresnel lens plate, 3 for a lenticular lens sheet, 4 for a light absorbing layer, 5 for a Fresnel lens, and 6 for a sheet or plate made of a methyl methacrylate (co) polymer.

DETAILED DESCRIPTION OF THE INVENTION

Each of the compositions [1a] and [1b] of the present invention is a UV-curable resin composition for use in the formation of a Fresnel lens on a sheet or plate made of a methyl methacrylate (co)polymer, namely a homopolymer of methyl methacrylate or a copolymer of methyl methacrylate with one or more other (meth)acrylates.

The composition [1a] is a UV-curable resin composition of the urethane group-containig (meth)acrylate type and the composition [1b] is a UV-curable resin composition of the (meth)acrylate type which is further supplemented with a polyester (C1) and a phosphate (C2). With either of these compositions, the resin formed by UV radiation cure is a (meth)acrylate resin.

The urethane group-containig (meth)acrylate (A2) in the composition [1a] of the invention and the polyester (C1) in the composition [1b] are comparable in that they share a moiety of an aromatic diol (a1) in common.

The aromatic diol (a1) is an addition product of a bisphenol with alkylene oxide as can be seen from the above general formula (1).

The bisphenol mentioned above includes such species as bisphenol A, bisphenol F, and bisphenol AD.

The alkylene oxide includes such species as ethylene oxide (briefly, EO), propylene oxide (briefly, PO) and these may be used in combination to give an EO–PO random addition product or an EO–PO block addition product.

Each of m and n in general formula (1), both representing the number of moles of alkylene oxide added, is an integer of usually 1 to 15 and preferably 1 to 7, and (m+n) is usually 2 to 20 and preferably 2 to 12. If (m+n) is within said range, the scratch resistance of the lens available on cure of the composition will be good and the refractive index of the cured composition will be high.

The addition product of the bisphenol with alkylene oxide can be produced typically by a known process such as a prosess that EO and/or PO are added to a bisphenol by addition reaction in the presence of a basic catalysts The composition [1a] of the present invention comprises, as mentioned above, a (meth)acrylate containing hydroxyl group and aromatic ring (A1), a urethane group-containing (meth)acrylate (A2), an aromatic ring-containing (meth) acrylate (A3), and a photopolymerization initiator (B) as essential components.

The (meth)acrylate containing hydroxyl group and aromatic ring (A1) includes but is not limited to (A11) 2-hydroxy-3-phenoxypropyl (meth)acrylate, (A12) 2-hydroxy-3-(2'-, 3'-, or 4'-methylphenoxy)propyl (meth)acrylate, (A13) (meth)acryloyloxyethyl (meth)acryloyloxy-2-hydroxypropyl phthalate, and (A14) the addition product of a bisphenol (e.g. bisphenol A, bisphenol F, or bisphenol S) glycidyl ether with a (math) acrylate.

Preferred among them are said (A11) and said (A12), both of which have low viscosity values.

The urethane group-containing (meth)acrylate (A2) includes but is not limited to (A21) the reaction product of an organic polyisocyanate (b2) with a hydroxyl group-containing (meth)acrylate (b3) and an aromatic diol (a1), (A22) the reaction product of (b2) with (b3) and a polyester polyol (b1) derived from (a1) and a dicarboxylic acid (a2), (A23) the reaction product of (b2) with (b3) and the combination of (a1) and (b1).

Preferred among them is (A22).

The dicarboxylic acid (a2) includes but is not limited to maleic acid, fumaric acid, succinic acid, adipic acid, phthalic acid, isophthalic acid, terephthalic acid, and acid anhydrides thereof. Preferred among them are maleic acid, fumaric acid, succinic acid and adipic acid.

The polyester polyol (b1) can be obtained from an aromatic diol (a1) and a dicarboxylic acid (a2) under the known esterification conditions. The OH/COOH equivalent ratio for the production of the polyester polyol (b1) is generally 2.0 to 1.05 and preferably 2.0 to 1.5.

The diol as a constituent of a urethane group-containing (meth)acrylate (A2) is said (a1) and/or said (b1) but where necessary a third diol can be used in conjunction. The third diol is preferably one having a molecular weight of not more than 400. The use of a diol with a molecular weight of more than 400 is undesirable, since the refractive index will be seriously decreased.

The third diol includes but is not limited to ethylene glycol, propylene glycol, neopentyl glycol, 3-methyl-1,5-pentanediol, 1,4-butanediol, 1,6-hexanediol, polyethylene glycol (degree of polymerization: 2 to 9), polypropylene glycol (degree of polymerization: 2 to 6), and polycaprolactonediol (degree of polymerization: 2 or 3).

The proportion of the third diol, if used, is generally not more than 30 weight % and preferably not more than 10 weight %, based on the weight of (a1).

The organic polyisocyanate (b2) as a constituent of said urethane group-containing (meth)acrylate (A2) includes but is not limited to (b21) 2,4-tolylene diisocyanate, (b22) 2,6-tolylene diisocyanate, (b23) xylylene diisocyanate, (b24) 4,4'-diphenylmethane diisocyanate, (b25) isophorone diisocyanate, (b26) dicyclohexylmethane diisocyanate, (b27) hexamethylene diisocyanate, and
(b28) the modification products thereof (e.g. carbodiimides, urethodiones, biurets, isocyanurates, etc.). In addition, optional combinations of the above compounds can also be mentioned.
Preferred, among them, are (b21), (b22), (b23) and (b24) and combinations of two or more of them.

The hydroxyl-containing (meth)acrylate (b3) as a constituent of said urethane group-containing (meth)acrylate (A2) includes but is not limited to
(b31) 2-hydroxyethyl (meth)acrylate,
(b32) 2-hydroxypropyl (meth)acrylate,
(b33) 4-hydroxybutyl (meth)acrylate,
(b34) 2-hydroxy-3-butoxypropyl (meth)acrylate, and
(b35) 2-hydroxy-3-phenoxypropyl (meth)acrylate.

Preferred, among them, are (b31) and (b32).

There is no particular limitation on production method for said (A2) but a typical process comprises reacting said (a1) and/or said (b1) with said (b2) in the known manner for urethane-forming reaction and, then, reacting with (b3).

The number average molecular weight of a urethane group-containing (meth)acrylate (A2) is generally 2,000 to 10,000 and preferably 3,000 to 8,000. If the number average molecular weight is within the range of 2,000 to 10,000, sufficient flexibility will be obtained and the viscosity of the resin composition will be sutable for not causing air entrapment to ensuring the lens functions.

The refractive index (25° C.) of said (A2) is generally not less than 1.52 and preferably not less than 1.53.

The aromatic ring-containing monofunctional (meth) acrylate (A3) includes but is not limited to
(A31) phenyl (meth)acrylate,
(A32) benzyl (meth)acrylate,
(A33) a (meth)acrylate of addition product of phenol with EO and/or PO (number of moles of EO and/or PO added: 1 to 6),
(A34) a (meth)acrylate of addition product of nonylphenol with EO and/or PO (number of moles of EO and/or PO added: 1 to 6), and
(A35) a (meth)acrylate of addition product of dodecylphenol with EO and/or PO (number of moles of EO and/or PO added: 1 to 6).

Preferred, among them, are (A33), (A34) and a combination thereof.

The composition [1a] of the present invention may contain 20 to 60 weight % of said (A1) and preferably 30 to 50 weight %, 10 to 50 weight % of said (A2) and preferably 20 to 40 weight % and 5 to 50 weight % of said (A3) and preferably 10 to 40 weight %.

Using said (A1) in a proportion of 20 to 60 weight % may be attainable of satisfactory adhesion to a sheet or plate and of the viscosity suitable for preventing air entrapment in moulding to make sure of the lens functions.

Using said (A2) in a proportion of 10 to 50 weight % may be attainable of flexibility and scratch resistance and also of the viscosity suitable for preventing air entrapment in moulding to make sure of the lens functions.

Using said (A3) in a proportion of 5 to 50 weight % will ensure suitable viscosity and adhesion to a sheet or plate.

In the composition [1a] of the present invention, the urethane group-containing (meth)acrylate (A2) as it is alone shows antistatic properties, but there are cases that (A2) alone ensures only inadequate antistatic properties. In order to realize sufficient antistatic properties with (A2) alone, it must be incorporated in an increased proportion but it occasionally causes deterioration of adhesion.

In such cases, where necessary, the antistatic properties can be improved by using a phosphate (C2) of the following general formula (2) in combination with said (A2), whereby the objective performance can be obtained. This phosphate (C2) contributes to improve scratch resistance of the cured composition and, at the same time, functions as a mold release agent $$[R(OCH_2CH_2)_sO]_tPO(OH)_{(3-t)} \quad (2)$$

wherein R represents alkyl group containing 5 to 16 carbon atoms, s represents an integer of 1 to 4, t represents an integer of 1 or 2.

Referring to general formula (2), R is an alkyl group containing 5 to 16 carbon atoms. With R inside the above carbon number range, sufficient antistatic performance can be obtained.

The symbol s stands for an integer of 1 to 4. If s is equal to zero, the phosphate (C2) will be insoluble in the composition of the invention or, even if soluble, will tend to separate out during storage. If the value of s is 5 or more, the required antistatic properties will not be fully expressed.

The symbol t represents an integer of 1 or 2. If t is equal to zero, said (C2) will remain insoluble in the composition [1a] of the invention If t is equal to 3, antistatic properties will not be fully expressed.

The phosphate (C2) can be obtained by adding EO to an aliphatic alcohol of 5 to 16 carbon atoms in a known manner and reacting the addition product further with either phosphoric acid or a derivative thereof (e.g. diphosphorus pentaoxide).

The aliphatic alcohol of 5 to 16 carbon atoms mentioned above is a straight-chain monohydric alcohol or a branched monohydric alcohol, which includes n-hexyl alcohol, n-octyl alcohol, 2-ethylhexyl alcohol and n-lauryl alcohol, to mention just a few preferred species.

The proportion of the phosphate (C2), when used, in the composition [1a] of the present invention is preferably 0.1 to 2.0 weight % and more preferably 0.3 to 1.5 weight %. In using the proportion of 0.1 to 2.0 weight % of (C2), appreciable antistatic propertis and adhesion to a sheet or plate will be insured.

For improving adhesion further, among other purposes, a plasticizer (C3) with a solubility parameter in the range of 10.0 to 11.5 may be optionally incorporated in the composition [1a] of the present invention.

The solubility parameter (briefly, SP) of plasticizer (C3) is 10.0 to 11.5 and preferably 10.5 to 11.2. SP value of (C3) within the above range will realize improvement in adhesion. The SP values mentioned in this specification are the values calculated in accordance with Polymer Engineering and Science, 14 (2), 147 (1974).

The plasticizer (C3) includes but is not limited to the following species.

| | |
|---|---|
| Dimethyl phthalate | (SP 10.90) |
| Diethyl phthalate | (SP 10.54) |
| Dibutyl phthalate | (SP 10.07) |
| Butyl benzyl phthalate | (SP 10.74) |
| Dicyclohexyl phthalate | (SP 10.39) |
| Ethyl phthalyl ethyl glycolate | (SP 10.75) |
| Butyl phthalyl butyl glycolate | (SP 10.17) |
| Triphenyl phosphate | (SP 10.73) |
| Tricresyl phosphate | (SP 10.46) |
| Diphenyl cresyl phosphate | (SP 10.54) |
| Polyethylene glycol dibenzoate (degree of polymerization of ethylene glycol; 1 to 12) | (SP 11.15 to 10.02) |
| Polypropylene glycol dibenzoate (degree of polymerization of propylene glycol; 1 to 4) | (SP 10.89 to 10.04) |

Preferred, among them, are species with high refractive indices such as dimethyl phthalate, butyl benzyl phthalate, triphenyl phosphate, tricresyl phosphate and diphenyl cresyl phosphate.

The proportion of plasticizer (C3), if used, in the composition [1a] of the present invention is 1 to 20 weight % and preferably 3 to 15 weight %. In using the (C3) in the proportion of 1 to 20 weight %, sufficient improvement can be obtained in adhesion to a sheet or plate and the hardness of the cured composition will be sufficent to provide the lens with dimensional stability.

In the composition [1a] of the present invention, one or more (meth)acrylate monomers other than said (A1), said (A2), and said (A3) can be employed where necessary.

The other (meth)acrylate monomers mentioned above may, for example, be the following species.

Tetrahydrofurfuryl (meth)acrylate
Methoxyethyl (meth)acrylate
Ethoxyethyl (meth)acrylate
Butoxyethyl (meth)acrylate
Glycidyl (meth)acrylate
Isobornyl (meth)acrylate
2-Hydroxyethyl (meth)acrylate
2-Hydroxypropyl (meth)acrylate
4-Hydroxybutyl (meth)acrylate
2-Hydroxy-3-butoxypropyl (meth)acrylate
Ethylene glycol di(meth)acrylate
1,2- or 1,3-Propylene glycol di(meth)acrylate
Diethylene glycol di(meth)acrylate
1,6-Hexanediol di(meth)acrylate
Neopentyl glycol di(meth)acrylate
Di(meth)acrylate of a bisphenol (e.g. bisphenol A, bisphenol F, or bisphenol S) or di(meth)acrylate of the addition product of the bisphenol with alkylene oxide
Trimethylolpropane tri(meth)acrylate
Pentaerythritol tetra(meth)acrylate
Dipentaerythritol hexa(meth)acrylate
Alkylene oxide-modified trimethylolpropane tri(meth) acrylate
Alkylene oxide-modified pentaerythritol tetra(meth) acrylate
Alkylene oxide-modified dipentaerythritol hexa(meth) acrylate The proportion of such other (meth)acrylate monomer or monomers to the total weight of (A1), (A2) and (A3) combined is usually not more than 30 weight % and preferably not more than 20 weight %.

The photopolymerization initiator (B) as an essential component of both compositions [1a] and [1b] of the present invention includes but is not limited to benzoin alkyl ethers, benzyl dimethyl ketal, 1-hydroxycyclohexylphenylketone, 2-hydroxy-2-methyl-1-phenylpropane-1-one, benzophenone, methylbenzoyl formate, isopropylthioxanthone. These may be combindly used.

The proportion of the photopolymerization initiator (B) is usually 0.1 to 10 weight % and preferably 0.5 to 6 weight %, based on the total composition weight for each of compositions [1a] and [1b].

Where necessary, a thermal polymerization inhibitor, antifoaming agent, leveling agent, coupling agent, antistatic agent, ultraviolet absorber, and other known additives can be selectively incorporated in each of compositions [1a] and [1b].

The composition [1b] of the present invention contains said polyester (C1) and said phosphate (C2) in addition to said components (A1) and (A4) as well as said photopolymerization initiator (B).

Among the above components, said (A1) and said (B) as essential components are also contained in composition [1a] of the invention, while the phosphate (C2) is an optional component of composition [1a], and these components are as described hereinbefore.

The species and preferred species of each of (A1), (B), and (C2) in composition [1b] of the invention are the same as those in composition [1a].

The mono- or di(meth)acrylate monomer (A4) has a molecular weight of 80 to 200 and a boiling point of over 150° C. at atmospheric pressure. If the molecular weight is less than 80, the working environment will be adversely affected by the dermal irritancy and intense odor. On the other hand, if the molecular weight exceeds 200, adhesion of the composition to a sheet or plate made of a methyl methacrylate (co)polymer will be adversely affected. If the boiling point is equal to or below 150° C., its high volatility will interfere with the production of products of stable performances.

The mono- or di(meth)acrylate monomer (A4) includes but is not limited to
(A41) phenoxy ethylene glycol acrylate,
(A42) tetrahydrofurfuryl (meth)acrylate,
(A43) methoxyethyl (meth)acrylate,
(A44) ethoxyethyl (meth)acrylate,
(A45) butoxyethyl (meth)acrylate,
(A46) glycidyl (meth)acrylate,
(A47) 2-hydroxyethyl (meth)acrylate,
(A48) diethylene glycol (meth)acrylate,
(A49) 1,2- or 1,3-propylene glycol diacrylate.

Preferred, among them, are (A42), (A48), and a combination thereof.

In the composition [1b] of the present invention, said (meth)acrylate (A1) and said mono- or di(meth)acrylate monomer (A4) are components for improved adhesion to a sheet or plate made of a methyl methacrylate (co)polymer.

The polyester (C1) mentioned above has a moiety of an aromatic diol (a1) represented by the general formula (1) and can be obtained by esterification reaction between diol compound comprising said aromatic diol (a1) and the dicarboxylic acid (a2).

As the diol for a diol moiety of (C1), one or more other diols can be used in combination with (a1) where necessary. The other diols that can be used are preferably diols having molecular weights less than 400. Use of a diol with a molecular weight in excess of 400 results in a marked decrease in refractive index.

Such other diol includes but is not limited to ethylene glycol, propylene glycol, neopentyl glycol, 3-methyl-1,5-pentanediol, 1,4-butanediol, 1,6-hexanediol, polyethylene glycol (degree of polymerization; 2 to 9), polypropylene glycol (degree of polymerization; 2 to 6), polycaprolactonediol (degree of polymerization; 2 or 3).

The other diol or diols can be used in a proportion of usually not more than 30 weight % and preferably not more than 20 weight %, relative to (a1).

The dicarboxylic acid (a2) as a constituent of said polyester (C1) are the same as those in composition [1a], preferably, among them, are species having highly refractive indices such as maleic acid, fumaric acid, phthalic acid, isophthalic acid, terephthalic acid, acid anhydride thereof and combinations of two or more of them.

The number average molecular weight of said polyester (C1) is usually 5,000 to 60,000 and preferably 7,000 to 40,000. If the number average molecular weight of (C1) is within the range of 5,000 to 60,000, the composition will not retain tackiness after UV cure and the viscosity of the composition will not be increased so much that the problem that the residual air cells in the molding will interfere with lens functions will not occur.

The polyester (C1) can be produced by the known esterification reaction. The OH/COOH equivalent ratio for use in the production of (C2) is usually 1.3 to 0.7 and preferably 1.2 to 0.8.

The proportions of said (A1), said (A4), and said polyester (C1) in the composition [1b] of the present invention may be 10 to 50 weight % of (A1) and preferably 15 to 30 weight %, 10 to 50 weight % of (A4) and preferably 15 to 40 weight %, and 10 to 40 weight % of (C1) and preferably 15 to 35 weight %.

If the proportion of (A1) is within the range of 10 to 50 weight %, adhesion to a sheet or plate made of a methyl methacrylate (co)polymer will be adequate and the viscosity of the system will be good for workability.

If the proportion of (A4) is within the range of 10 to 50 weight %, adhesion to a sheet or plate made of a methyl methacrylate (co)polymer will be adequate and the refractive index of the lens will not be decreased and the viscosity of the system will be good for workability.

If the proportion of (C1) is within the range of 10 to 40 weight %, desired antistatic properties will be obtained and the viscosity will not be increased so much as to cause formation of air cells in the molding and interference with lens functions.

The composition [1b] of the present invention contains said phosphate (C2) in addition to said polyester (C1) as an essential component. Each of components (C1) and (C2) has its own antistatic properties. However, with (C1) alone, it must be used in a large proportion in order to obtain an adequate degree of antistaticity and this practice would adversely affect adhesion. On the other hand, (C2) alone would not provide for a sufficient antistatic effect. Thus, the use of (C1) and (C2) in combination results in improved antistatic properties to contribute to the desired performance. Furthermore, (C2) not only contributes to improved scratch resistance of the cured composition but functions as a mold release agent.

The proportion of said phosphate (C2) in the composition [1b] of the present invention is usually 0.1 to 2 weight % and preferably 0.3 to 1.5 weight %. If the proportion is within the range of 0.1 to 2 weight %, (C2) adequately contributes to antistatic properties and has adequate adhesion to the substrate.

In addition to said (A1) and said (A4) as essential components, the composition [1b] of the present invention may contain one or more other (meth)acrylate monomers. The other (meth)acrylate monomer that can be used includes but is not limited to the followings.
Nonylphenoxy diethylene glycol (meth)acrylate
Dodecylphenoxy diethylene glycol (meth)acrylate
Diethylene glycol di(meth)acrylate
1,6-Hexanediol di(meth)acrylate
Neopentyl glycol di(meth)acrylate
Bisphenol (e.g. bisphenol A, bisphenol F, bisphenol S) or di(meth)acrylate of the addition product of bisphenol with alkylene oxide
Trimethylolpropane di- or tri(meth)acrylate
Pentaerythritol tri- or tetra(meth)acrylate
Dipentaerythritol tri-, tetra-, penta-, or hexa(meth) acrylate
Alkylene oxide-modified trimethylolpropane tri(meth) acrylate
Alkylene oxide-modified pentaerythritol tetra(meth) acrylate
Alkylene oxide-modified dipentaerythritol hexa(meth) acrylate The viscosity of the composition [1a] or [1b] according to the present invention is preferably 500 to 5,000 cps at the casting temperature. If the viscosity on casting is within the above range, air cells will not be entrapped in the molding and hence will not impair less functions.

The refractive indices (25° C.) of the cured resins from the compositions [1a] and [1b] of the present invention is usually not less than 1.54 and preferably not less than 1.55. Moreover, the surface resistivities of these cured resins are usually not more than $10^{13}$ Ω and preferably not more than $10^{12}$ Ω. Since the compositions [1a] and [1b] of the present invention can thus be tailored to yield cured resins with refractive indices not less than 1.54, sufficiently short focal lengths can be realized when they are applied to the manufacture of Fresnel lens. Moreover, because the compositions have been provided with antistatic properties, no static electricity is generated in the assembling of a lens sheet or a lens plate so that improved handling workability can be expected with no deposits of dust.

Each of the compositions [1a] and [1b] of the present invention can be cured by UV irradiation. There is no particular limitation on the type of UV irradiation equipment but a high-pressure mercury lamp or a metal halide lamp can be used as a radiation source.

Figure 1:
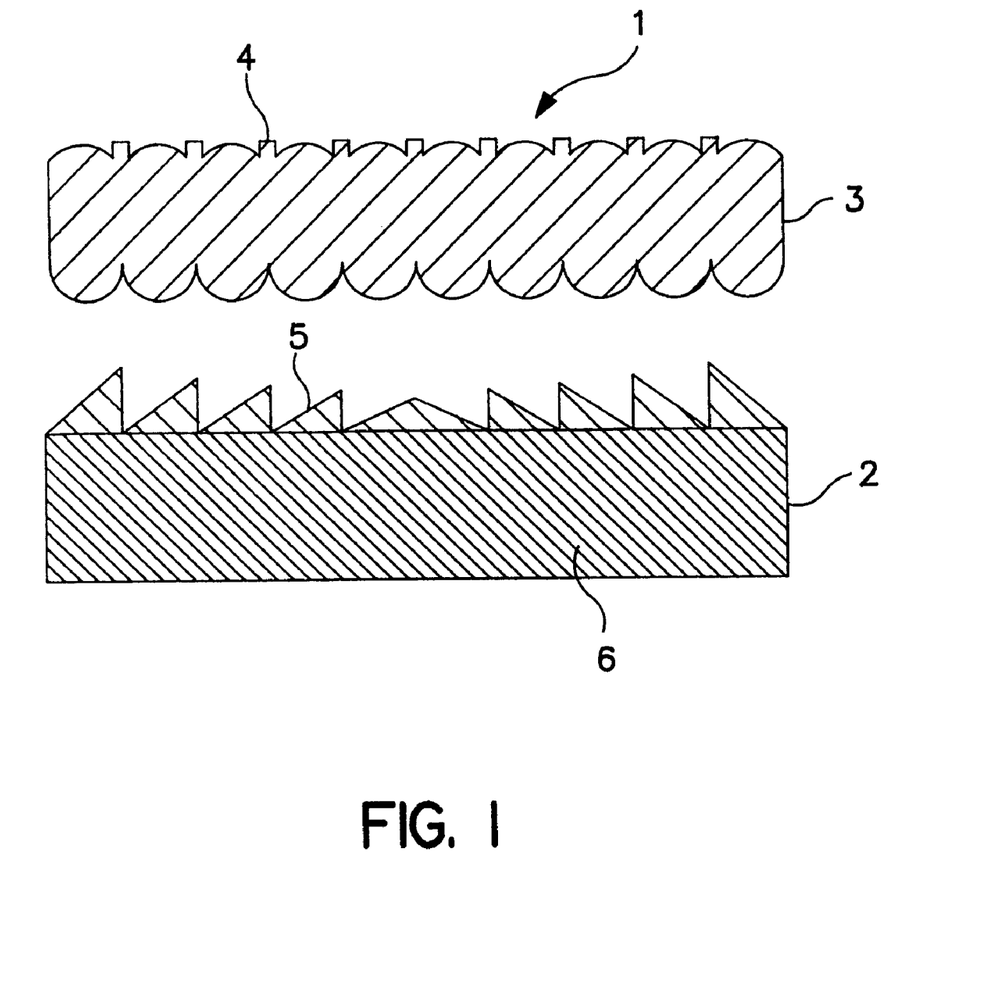
FIG. 1 is a sectional view showing one example of a rear projection screen.

As shown in FIG. 1, the rear projection screen 1 of the invention comprises a sheet or plate 6 made of a methyl methacrylate (co)polymer and the Fresnel lens 5 formed by the UV curing of the composition [1a] or [1b] of the invention in situ on the light emergence surface of said sheet or plate 6, and a lenticular lens sheet 3 comprising lenticular lenses arranged on both incidence and emergence surfaces and having light absorbing layer 4 in the non-light-converging (non-light emerging) zones formed on the emergence surface as the projected light is converged by the lenticular lenses on the incidence surface in such a manner that the Fresnel lens 5 is juxtaposed with the lenticular lenses on the incidence surface of lenticular lens sheet 3.

The Fresnel lens 5 is directly formed on the sheet or plate 6 by UV cure of said composition [1a] or [1b] without interposition of an adhesive layer such as a primer layer on the sheet or plate 6.

The sheet or plate thus constitued by disposing thereon the Fresnel lens of the present invention may be refered to as the Fresnel lens sheet or Fresnel lens plate in the specification.

The rear projection screen 1 of the present invention comprises the Fresnel lens sheet or Fresnel lens plate 2 carrying the Fresnel lens 5 formed by curing the composition [1a] or [1b] of the invention, and in addition to the use in combination with the lenticular lens sheet 3 as illustrated in FIG. 1, it can be used in combination with various other alternative screen lens sheets.

The sheet or plate 6 is made of a methyl methacrylate (co)polymer, viz. a homopolymer of methyl methacrylate or a copolymer of methyl methacrylate with one or more other alkyl (meth)acrylates the carbon number of the alkyl moiety of which are usually 1 to 18.

The methyl methacrylate content of said sheet or plate is usually not less than 70 weight % and preferably not less than 80 weight %. If the proportion of methyl methacrylate is within said range, adequate adhesion to the cured composition of the invention will be insured.

The sheet or plate 6 made of a methyl methacrylate (co) polymer can be formed by the known molding technique such as injection molding, extrusion molding, or casting.

The thickness of the sheet or plate may be ranged from 0.5 to 5 mm.

Production of the Fresnel lens sheet or Fresnel lens plate can be carried out typically by a process which comprises applying the composition [1a] or [1b] of the invention to a Fresnel lens mold, superimposing said sheet or plate on said composition under application of pressure to avoid entrapping of air, irradiating the assemblage with ultraviolet light to cure the composition [1a] or [1b] followed by releasing from the mold.

EXAMPLES

The following examples illustrate the present invention in further detail and should by no means be construed as defining the scope of the invention. In the examples, all parts are by weight.

Examples of Synthesis 1 to 3

Using the components (a1), (a2), (b2) and (b3) according to the formulas (weight ratios) indicated in Table 1, urethane group-containing acrylate (A2-1 to A2-3) were produced by the following method. The refractive index (25° C.) of each sheet was determined with an Abbe refractometer (manufactured by Atago). The results are shown in Table 1.

Synthetic process

A four-necked flask equipped with a stirrer, condensor and thermometer was charged with the indicated amounts of (a1) and (a2) and 0.025 part of dibutyltin oxide and the dehydrative esterification reaction was carried out at 10 mmHg and 200° C. for 8 hours. To the resulting polyester (b1) was added the indicated amount of (b2) and the reaction was further carried out at 80 to 90° C. for 2 hours. Then, the indicated amount of (b3) was added and the reaction was further carried out at 80 to 90° C. for 3 hours. In this manner, urethane group-containing acrylates (A2-1 to A2-3) were synthesized.

TABLE 1

| Example of Synthesis | 1 | 2 | 3 |
| --- | --- | --- | --- |
| Symbol | A2-1 | A2-2 | A2-3 |
| a1 | Bisphenol A EO (10 mol)addition product | Bisphenol A EO (6 mol)addition product | Bisphenol A EO (4 mol)addition product |
| Amount of a1 | 401 | 400 | 400 |
| a2 | Maleic anhydride | Succinic acid | Succinic acid |
| Amount of a2 | 29.4 | 48.0 | 72.8 |
| b2 | Xylylene diisocyanate | Tolylene diisocyanate | Tolylene diisocyanate |
| Amount of b2 | 69.2 | 86.0 | 79.0 |
| b3 | Hydroxyethyl acrylate | Hydroxyethyl acrylate | Hydroxyethyl acrylate |
| Amount of b3 | 15.8 | 21.0 | 33.8 |
| Number average mol. wt. | 7,480 | 6,120 | 4,050 |
| Refractive index (25° C.) | 1.546 | 1.537 | 1.550 |

In the table, EO stands for ethylene oxide and PO for propylene oxide.

Comparative Examples of Synthesis 1 and 2

Using the diol, (b2), and (b3) in accordance with the formulas (weight ratios) shown in Table 2, control urethane group-containing acrylates (UA-1 and UA-2) were synthesized by the following comparative method of synthesis. The refractive index (25° C.) of each urethane group-containing acrylate synthesized is shown in Table 2.

Comparative method of synthesis

The same reactor as used for the above-described method of synthesis was charged with the indicated amounts of diol and (b2) and the reaction was carried out at 80 to 90° C. for 2 hours. Then, the indicated amount of (b3) was added and the reaction was further carried out at 80 to 90° C for 3 hours. In this manner, urethane group-containing acrylates (UA-1 and UA-2) were obtained.

TABLE 2

| Comparative Example of Systhesis | 1 | 2 |
| --- | --- | --- |
| Symbo1 | UA-1 | UA-2 |
| Diol | Bisphenol A EO (40 mol) addition product | Polycaprolactone-diol (Mw = 2,000) |
| Amount of diol | 398 | 400 |
| b2 | Tolylene diisocyanate | Isophorone diisocyanate |
| Amount of b2 | 51.2 | 44.4 |
| b3 | Hydroxyethyl acrylate | Hydroxyethyl acrylate |
| Amount of b3 | 21.9 | 46.4 |
| Number average mol. wt. | 4,995 | 2,676 |
| Refractive index (25° C.) | 1.517 | 1.484 |

Examples 1 to 5

According to the formulas (weight ratios) shown in Table 3, resin compositions [1a] of the invention (Examples 1 to 5) were prepared. The viscosity of each sample at 35° C. was measured with a BL viscosimeter (manufactured by Tokyo Keiki). In addition, 50 μm films were prepared and irradiated with 1000 mJ/cm$^2$ of ultraviolet light to provide cured films and the refractive index of each film at 25° C. was determined. The viscosity (35° C.) and refractive index of each film are shown in Table 4.

Comparative Examples 1 to 3

According to the formulas (weight ratios) shown in Table 3, comparative resin compositions (Comparative Examples 1 to 3) were prepared. The viscosity (35° C.) and refractive index of each cured composition are shown in Table 4.

Test Example 1

Using the resin compositions of Examples 1 to 5 and Comparative Examples 1 to 3, Fresnel lenses were prepared by the following test method and tested for adhesion to a sheet, mold releasability, and scratch resistance. The results are shown in Table 4.

Test method

Each of the UV-curable resin compositions shown in Table 3 was applied, in a thickness of 50 to 150 μm, onto a chrome-plated Fresnel lens mold (50 cm×50 cm) by the dispenser controlled at 35° C., and a 2 mm-thick sheet made of a methyl methacrylate copolymer (Sumipex HT(trade name), manufactured by Sumitomo Chemical) was superimposed on the dispensed resin composition in the mold under application of pressure with care exercised to avoid air entrapment. Then, using a high-pressure mercury lamp, the UV-curable resin was cured by 1,000 mJ/cm$^2$ of UV light and the mold was then released to provide a Fresnel lens.

The mold releasability and the performance parameters of each Fresnel lens were evaluated as follows.

(1) Mold releasability: The ease of release from the mold in the production of the Fresnel lens Criteria     o: Easy to release x: Difficult to release, with deformation ensuing
(2) Air entrapment: The presence or absence of air cells in the Fresnel lens
Criteria ○: no air cells
x: Air cells (3) Adhesion: The degree of adhesion of the UV-cured resin composition to the sheet The sample is crosshatched with a knife at 1 mm/pitch (10×10) and a cellophane tape was set in position and peeled off at an angle of 90 degrees. The degree of exfoliation of the cured resin from the sheet was evaluated.
Criteria
  ○: not exfoliated
  x: Exfoliated (4) Scratch resistance: Scratchability of the Fresnel lens
Criteria
  ○: Scratching with the finger nail leaves no mark
  x: Scratching with the finger nail leaves a mark

TABLE 3

|    |               | Example |    |    |    |    | Comparative Example |    |    |
|----|---------------|---------|----|----|----|----|---------------------|----|----|
|    |               | 1       | 2  | 3  | 4  | 5  | 1                   | 2  | 3  |
| A1 | Aronix M-5700 | 50      | 50 | 45 | 30 | 30 | 10                  | 50 | 50 |
| A2 | A2-1          | 25      |    |    |    |    | 30                  |    |    |
|    | A2-2          |         | 30 |    |    |    |                     |    |    |
|    | A2-3          |         |    | 40 | 40 |    | 40                  |    |    |
|    | UA-1          |         |    |    |    |    |                     | 30 |    |
|    | UA-2          |         |    |    |    |    |                     |    | 30 |
| A3 | Aronix M-101  | 15      | 20 |    | 20 | 35 | 50                  | 10 |    |
|    | Aronix M-111  |         |    | 15 |    |    |                     |    | 20 |
|    | NK Ester A-400| 10      |    |    |    |    | 10                  |    |    |
|    | Viscoat 195   |         |    |    | 10 | 5  |                     |    |    |
| B  | Darocur 1173  | 2       | 2  | 2  | 2  | 2  | 2                   | 2  | 2  |

In the table, each component means as follows;

| | |
|---|---|
| Aronix M-5700: (trade name) | 2-Hydroxy-3-phenoxypropyl acrylate, manufactured by Toagosei Chemical Industry Co. Ltd. |
| Aronix M-101: (trade name) | Phenoxy diethylene glycol acrylate, manufactured by Toagosei Chemical Industry Co. Ltd. |
| Aronix M-111: (trade name) | Nonylphenoxy ethylene glycol acrylate, manufactured by Toagosei Chemical Industry Co. Ltd. |
| NK Ester A-400: (trade name) | Polyethylene glycol diacrylate, manufactured by Shin Nakamura Kagaku |
| Viscoat 195: (trade name) | 1,4-Butanediol diacrylate, manufactuted by Osaka Yuki Kagaku |
| Darocur 1173: (trade name) | 2-Hydroxy-2-methyl-1-phenylpropan-1-one, manufactured by Ciba-Geigy |

TABLE 4

|             |   | Viscosity/ cps | Refractive index | Release-ability | Air entrapment | Adhesion | Scratch resistance |
|-------------|---|----------------|------------------|-----------------|----------------|----------|--------------------|
| Example     | 1 | 3,200          | 1.552            | ○               | ○              | ○        | ○                  |
|             | 2 | 3,660          | 1.550            | ○               | ○              | ○        | ○                  |
|             | 3 | 4,800          | 1.553            | ○               | ○              | ○        | ○                  |
|             | 4 | 3,400          | 1.551            | ○               | ○              | ○        | ○                  |
|             | 5 | 3,800          | 1.550            | ○               | ○              | ○        | ○                  |
| Comparative Example | 1 | 2,500 | 1.549 | ○ | ○ | X | ○ |
|             | 2 | 4,500          | 1.539            | ○               | ○              | X        | ○                  |
|             | 3 | 2,800          | 1.521            | X               | X              | X        | X                  |

Example 6 to 10

In accordance with the formulas (weight ratios) shown in Table 5, resin compositions (1a) each containing a plasticizer (C3) according to the invention (Examples 6 to 10) were prepared. The viscosity of each sample at 35° C. was measured with a BL viscosimeter (manufactured by Tokyo Keiki). In addition, 50 μm films were prepared and irradiated with 1000 mJ/cm$^2$ of ultraviolet light to provide cured sample films and the refractive index of each film at 25° C. was determined. The viscosity (35° C.) and refractive index of each film are shown in Table 6.

Test Example 2

Using the resin compositions of Examples 6 to 10, Fresnel lenses were prepared in accordance with the same test method as Test Example 1 and evaluated for adhesion to a sheet, mold releasability, and scratch resistance. The results are shown in Table 6.

TABLE 5

|    |                  | Example |    |    |    |    |
|----|------------------|---------|----|----|----|----|
|    |                  | 6       | 7  | 8  | 9  | 10 |
| A1 | Aronix M-5700    | 50      | 40 | 30 | 40 | 40 |
| A2 | A2-1             | 30      | 35 | 40 |    |    |
|    | A2-2             |         |    |    | 30 | 30 |
|    | A2-3             |         |    |    |    |    |
| A3 | Aronix M-101     | 15      | 20 |    | 20 | 20 |
|    | Aronix M-111     |         |    | 15 |    |    |
| C3 | Tricresyl phosphate | 5    | 5  | 10 |    | 5  |
|    | Dimethyl phthalate |        |    |    | 10 |    |
|    | NK Ester A-400   |         |    | 5  |    |    |
|    | Viscoat 195      |         |    |    |    | 5  |
| B  | Darocur 1173     | 2       | 2  | 2  | 2  | 2  |

TABLE 6

|  |  | Viscosity/cps | Refractive index | Release-ability | Air entrapment | Adhesion | Scratch resistance |
|---|---|---|---|---|---|---|---|
| Example | 6 | 3,150 | 1.555 | ○ | ○ | ○ | ○ |
|  | 7 | 4,560 | 1.556 | ○ | ○ | ○ | ○ |
|  | 8 | 4,820 | 1.555 | ○ | ○ | ○ | ○ |
|  | 9 | 3,430 | 1.551 | ○ | ○ | ○ | ○ |
|  | 10 | 2,750 | 1.553 | ○ | ○ | ○ | ○ |

Example of Synthesis 4

An autoclave equipped with a stirrer, condenser and thermometer was charged with 558 parts of lauryl alcohol followed by addition of 264 parts of ethylene oxide at 50° C. and the reaction was conducted at 200° C. for 2 hours. To the resulting alcohol (822 parts), 137 parts of diphosphorus pentaoxide was added and the reaction was further carried out at 80 to 90° C. for 2 hours to provide a phosphate (C2-1).

Example of Synthesis 5

In the same autoclave as used in Example of Synthesis 4, 520 parts of octyl alcohol was reacted with 176 parts of ethylene, oxide at 50° C. and, then, with 280 parts of diphosphorus pentaoxide to provide a phosphate (C2-2).

Comparative Example of Synthesis 3

A four-necked flask equipped with a stirrer, condenser and thermometer was charged with 400 parts of lauric acid. After 300 parts of triethanolamine was added at room temperature, the reaction was carried out at room temperature for 2 hours to provide lauric acid triethanolamine salt (LA-1).

Examples 11 to 15

According to the formulas (weight ratios) shown in Table 7, resin compositions [1a] (Examples 11 to 15) each containing a phosphate (C2) were prepared. The viscosity (35° C.) of each composition was measured with a BL viscosimeter (manufactured by Tokyo Keiki). In addition, 50 μm-thick films were prepared and irradiated with ultraviolet light at 1000 mJ/cm$^2$ to provide cured films and the refractive index (25° C.) of each cured film was determined. The static properties was made by the following test method. The results are shown in Table 8.

Antistatic test

After conditioning to a temperature of 25° C. and a humidity of 60%, the surface resistivity of each Fresnel lens was measured with Ultra High Resistance Meter (manufactured by Advantest).

TABLE 7

|  |  | Example | | | | | Comparative Example | | |
|---|---|---|---|---|---|---|---|---|---|
|  |  | 11 | 12 | 13 | 14 | 15 | 1 | 2 | 3 |
| A1 | Aronix M-5700 | 50 | 40 | 30 | 40 | 40 | 50 | 40 | 40 |
| A2 | A2-1 | 30 | 30 | 40 |  |  | 30 | 30 |  |
|  | A2-2 |  |  |  | 30 | 35 |  |  | 30 |
|  | Aronix M-101 | 20 | 30 |  | 20 | 25 | 20 | 20 |  |
|  | Aronix M-111 |  |  | 25 |  |  |  |  | 30 |
|  | NK Ester A-400 |  |  | 5 |  |  |  | 10 |  |
|  | Viscoat 195 |  |  |  | 10 |  |  |  |  |
| C2 | C2-1 | 0.3 | 0.5 |  | 0.5 |  |  |  |  |
|  | C2-2 |  |  | 0.5 |  | 1.0 |  |  |  |
|  | LA-1 |  |  |  |  |  |  | 1.0 | 3.0 |
| B | Darocur 1173 | 2 | 2 | 2 | 2 | 2 | 2 | 2 | 2 |

TABLE 8

|  |  | Viscosity cps | Refractive index | Release-ability | Air entrapment | Adhesion | Scratch resistance | Surface resisitivity (Ω) |
|---|---|---|---|---|---|---|---|---|
| Example | 11 | 2,830 | 1.552 | ○ | ○ | ○ | ○ | $2.3 \times 10^{10}$ |
|  | 12 | 2,330 | 1.553 | ○ | ○ | ○ | ○ | $3.5 \times 10^{9}$ |
|  | 13 | 4,750 | 1.550 | ○ | ○ | ○ | ○ | $1.3 \times 10^{9}$ |
|  | 14 | 3,400 | 1.553 | ○ | ○ | ○ | ○ | $4.3 \times 10^{11}$ |
|  | 15 | 3,820 | 1.555 | ○ | ○ | ○ | ○ | $7.2 \times 10^{9}$ |
| Comparative Example | 1 | 2,760 | 1.553 | ○ | ○ | ○ | ○ | $6.4 \times 10^{14}$ |
|  | 2 | 2,450 | 1.552 | ○ | ○ | ○ | ○ | $5.2 \times 10^{14}$ |
|  | 3 | 2,940 | 1.551 | ○ | ○ | X | ○ | $7.8 \times 10^{13}$ | viscosity (35° C.) and cured refractive index values are shown in Table 8.

Test Example 3

Using the resin compositions of Examples 11 to 15, Fresnel lenses were prepared by the same method as Test Example 1 and evaluated for adhesion to a sheet, mold releasability, and scratch resistance. The evaluation of anti- Examples of Synthesis 6 and 7

Using the aromatic diol (a1) and dicarboxylic acid (a2) in accordance with the formulas (weight ratios) shown in Table 9, polyesters (C1-1) and (C1-2) were synthesized by the following method of synthesis. The refractive index (25° C.) of each polyester thus obtained was determined with an Abbe refractometer (manufactured by Atago). The results are shown in Table 1.

Method of synthesis

A four-necked flask equipped with a stirrer, condenser and thermometer was charged with the indicated amounts of (a1) and (a2) as well as 0.025 part of dibutyltin oxide and the dehydration esterification reaction was carried out at 10 mmHg and 200° C. for 8 hours to provide polyesters (C1-1) and (C1-2).

TABLE 9

|  | Example of Synthesis | |
|---|---|---|
|  | 1 | 2 |
| Symbol | Polyester (C1-1) | Polyester (C1-2) |
| a1 | Bisphenol A EO (10 mol) addition product | Bisphenol F PO (4 mol) addition product |
| Amount of a1 | 668 | 400 |
| a2 | Terephthalic acid | Maleic anhydride |
| Amount of a2 | 144 | 98 |
| Number average mol. wt. | 15,000 | 9,500 |
| Refractive index (25° C.) | 1.570 | 1.563 |

Examples 16 to 20

According to the formulas (weight ratios) shown in Table 10, resin compositions [1b] of the invention (Examples 16 to 20) were prepared. The viscosity (35° C.) of each composition prepared was measured with a BL viscosimeter (manufactured by Tokyo Keiki). In addition, 50 μm-thick sheets were prepared and irradiated with ultraviolet light at 1000 mJ/cm² to give cured sheets and the refractive index (25° C.) of each cured sheet was determined. The viscosity (35° C.) and cured refractive index (25° C.) values are shown in Table 11.

Comparative Examples 4 to 6

According to the formulas (weight ratios) shown in Table 10, comparative resin compositions (Comparative Examples 4 to 6) were prepared. The viscosity (35° C.) and cured refractive index (25° C.) values are shown in Table 11.

TABLE 10

|  |  | Example | | | | | Comparative Example | | |
|---|---|---|---|---|---|---|---|---|---|
|  |  | 1 | 2 | 3 | 4 | 5 | 1 | 2 | 3 |
| A1 | Aronix M-5700 | 50 | 50 | 55 | 45 | 55 | 50 | 50 | 45 |
| A4 | Light Ester EG | 20 | 25 |  | 15 | 15 | 20 | 25 |  |
|  | Light Ester THF |  |  | 15 | 10 |  |  |  | 20 |
| C1 | C1-1 | 30 | 25 |  | 30 | 20 | 30 |  |  |

TABLE 10-continued

|  |  | Example | | | | | Comparative Example | | |
|---|---|---|---|---|---|---|---|---|---|
|  |  | 1 | 2 | 3 | 4 | 5 | 1 | 2 | 3 |
|  | C1-2 |  |  | 25 |  |  |  | 25 | 30 |
| C2 | C2-1 | 0.3 | 0.5 |  | 0.5 |  |  |  |  |
|  | C2-2 |  |  | 0.5 |  | 1.0 |  |  |  |
|  | LA-1 |  |  |  |  |  |  | 1.0 | 3.0 |
|  | Neomer BA641 |  | 5 |  |  | 10 |  |  | 5 |
| B | Darocur 1173 | 2 | 2 | 2 | 2 | 2 | 2 | 2 | 2 |

In the table, each component means as folows;

| Light Ester EG: (trade name) | Ethylene glycol dimethacrylate, manufactured by Kyoeisha Kagaku |
| Light Ester THF: (trade name) | Tetrahydrofurfuryl acrylate, manufactured by Kyoeisha Kagaku |
| Neomer BA641: (trade name) | Diacrylate of Bisphenol A-EO (4 mol) addtion product, manufactured by Sanyo Chemical Industries, Ltd. |

Test Example 4

Using the resin compositions of Examples 16 to 20 and Comparative Examples 4 to 6, Fresnel lenses were prepared in accordance with the same method as Test Example 1 and evaluated for adhesion to a sheet, mold releasability, and scratch resistance. The antistatic properties were also tested by the same procedure as described in Test Example 3.

The results are shown in Table 11.

TABLE 11

|  |  | Viscosity cps | Refractive index | Releaseability | Air entrapment | Adhesion | Scratch resistance | Surface resisitivity (Ω) |
|---|---|---|---|---|---|---|---|---|
| Example | 1 | 3,550 | 1.558 | ○ | ○ | ○ | ○ | 5.6 × 10⁹ |
|  | 2 | 2,230 | 1.553 | ○ | ○ | ○ | ○ | 1.3 × 10⁹ |
|  | 3 | 2,750 | 1.551 | ○ | ○ | ○ | ○ | 1.1 × 10⁹ |
|  | 4 | 3,220 | 1.550 | ○ | ○ | ○ | ○ | 6.5 × 10¹¹ |
|  | 5 | 2,820 | 1.554 | ○ | ○ | ○ | ○ | 5.2 × 10⁹ |
| Comparative Example | 1 | 2,660 | 1.551 | ○ | ○ | ○ | ○ | 4.7 × 10¹⁴ |
|  | 2 | 2,250 | 1.550 | ○ | ○ | X | ○ | 2.1 × 10¹⁴ |
|  | 3 | 2,840 | 1.552 | ○ | ○ | X | ○ | 5.4 × 10¹³ |

The UV-curable Fresnel lens resin composition of the present invention has the following advantages.

1) Excellent adhesion to a sheet or plate made of a methyl methacrylate homopolymer or a copolymer of methyl methacrylate with one or more other (meth)acrylates.
2) Easily moldable into Fresnel lens and other optical parts.
3) Providing a cured resin with a refractive index as high as 1.54 or higher and excellent chemical resistance, toughness, heat resistance, and cold resistance.
4) The cured resin is highly antistatic.

Having the above-mentioned advantages, the composition of the present invention is of great utility value as a Fresnel lens material.

(Note: Table 11 surface resistivity values use LaTeX notation: $5.6 \times 10^9$, $1.3 \times 10^9$, $1.1 \times 10^9$, $6.5 \times 10^{11}$, $5.2 \times 10^9$, $4.7 \times 10^{14}$, $2.1 \times 10^{14}$, $5.4 \times 10^{13}$.)

The rear projection screen of the present invention includes the Fresnel lens sheet or Fresnel lens plate formed by curing the above UV-curable resin composition and, therefore, has an excellent Fresnel lens with high scratch resistance.

Therefore, there is no risk of damage or injury even on contact with other lens sheets during transport or assembly and it is no longer necessary to treat the surface by, for example, applying silicone oil or the like between the Fresnel lens sheet or Fresnel lens plate and the lenticular lens sheet.

Furthermore, the rear projection screen of the present invention has a highly antistatic Fresnel lens surface so that no deposit of dust occurs in assembly, thus contributing to improved workability.

In addition, since the refractive index of the rear projection screen is as high as at least 1.54, it is possible to manufacture Fresnel lenses of short focal length to reduce the distance between the rear projection screen and the light source, thus permitting the design and manufacture of low-profile, compact projection television devices of large screen size.

We claim:

1. A Fresnel lens comprising a resin formed by UV cure of a resin composition in situ on a sheet or plate made of a methyl methacrylate polymer or copolymer, wherein said resin composition comprises:

(A1) an acrylate or methacrylate containing hydroxyl group and aromatic ring;

(A2) a urethane group-containing acrylate or methacrylate having a moiety of an aromatic diol (a1) represented by the following general formula:

(1)

wherein Ph represents 1,4-phenylene group, $R^1$, $R^2$ and $R^3$ each represents a hydrogen atom or methyl group, m and n each represents an integer of 1 to 15, and (m+n) is equal to 2 to 20, said (A2) being a reaction product of an organic isocyanate (b2) with a hydroxyl group-containing acrylate or methacrylate (b3) and a polyester polyol (b1) derived from (a1) and a dicarboxylic acid (a2);

(A3) an aromatic ring-containing monofunctional acrylate or methacrylate; and (B) a photopolymerization initiator, said Fresnel lens containing 20 to 60 weight % of (A1), 10 to 50 weight % of (A2), 5 to 50 weight % of (A3), and 0.1 to 10 weight % of (B).

2. The Fresnel lens according to claim 1 wherein (a2) is at least one dicarboxylic acid selected from the group consisting of maleic acid, fumaric acid, succinic acid, adipic acid and the acid anhydrides thereof.

3. The Fresnel lens according to claim 2 wherein (A1) is an acrylate containing hydroxyl group and aromatic ring; $R^2$ and $R^3$ in formula (1) each represents methyl; and a dicarboxylic acid (a2) being maleic acid or fumaric acid.

4. The Fresnel lens according to claim 3 wherein $R^1$ in formula (1) is a methyl group, and said dicarboxylic acid is maleic acid.

5. A rear projection screen comprising a Fresnel lens sheet or Fresnel lens plate carrying the Fresnel lens according to claim 1 as provided on a sheet or plate made of a methyl methacrylate polymer or copolymer.

6. A rear projection screen comprising a Fresnel lens sheet or Fresnel lens late carrying the Fresnel lens according to claim 2 as provided on a sheet or plate made of a methyl methacrylate polymer or copolymer.

* * * * *